(12) United States Patent
Olkin et al.

(10) Patent No.: US 9,081,819 B2
(45) Date of Patent: *Jul. 14, 2015

(54) CONTEXTUAL SEARCH OF A COLLABORATIVE ENVIRONMENT

(71) Applicant: Oracle International Corporation, Redwood Shores, CA (US)

(72) Inventors: Terry M. Olkin, Niwot, CO (US); Alok Srivastava, Moraga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,523

(22) Filed: Nov. 7, 2012

(65) Prior Publication Data

US 2013/0073566 A1     Mar. 21, 2013

Related U.S. Application Data

(63) Continuation of application No. 11/393,139, filed on Mar. 29, 2006, now Pat. No. 8,332,386.

(51) Int. Cl.
*G06F 7/00* (2006.01)
*G06F 17/30* (2006.01)
*G06Q 10/10* (2012.01)

(52) U.S. Cl.
CPC .... *G06F 17/30513* (2013.01); *G06F 17/30418* (2013.01); *G06Q 10/10* (2013.01)

(58) Field of Classification Search
None
See application file for complete search history.

(56) References Cited

U.S. PATENT DOCUMENTS

| 5,608,900 | A | 3/1997 | Dockter et al. |
| 5,819,257 | A | 10/1998 | Monge et al. |
| 5,995,973 | A | 11/1999 | Daudenarde |

(Continued)

FOREIGN PATENT DOCUMENTS

| JP | 11-203322 | 7/1999 |
| JP | 2002-312404 | 10/2002 |

OTHER PUBLICATIONS

Notification of Transmittal of the International Search Report and the Written Opinion of the International Searching Authority, or the Declaration received in corresponding International application No. PCT/US07/06896.

(Continued)

*Primary Examiner* — Rehana Perveen
*Assistant Examiner* — Raheem Hoffler
(74) *Attorney, Agent, or Firm* — Hickman Palermo Becker Bingham LLP

(57) ABSTRACT

Techniques are provided for using bonds, which reflect relationships between items, to facilitate searches against the items. The degree of separation between any two given searchable items is based on the minimum number of bonds that have to be traversed to arrive at one of the two searchable items when starting at the other of the two searchable items. The bonds are used to respond to a search request, performing a search relative to a particular searchable item. For example, the search may involve only those searchable items that are within a particular degree of separation of the particular searchable item. As another example, the search may involve determining the order in which searchable items are compared against search criteria of the search request based on the degree of separation of the searchable items from the particular searchable item.

22 Claims, 3 Drawing Sheets

(56) References Cited

U.S. PATENT DOCUMENTS

| | | |
|---|---|---|
| 6,275,974 B1 | 8/2001 | Bartels et al. |
| 6,363,378 B1 | 3/2002 | Conklin et al. |
| 6,442,545 B1 | 8/2002 | Feldman et al. |
| 7,181,688 B1 * | 2/2007 | Umemoto et al. ............ 715/210 |
| 7,299,222 B1 | 11/2007 | Hogan et al. |
| 7,461,043 B2 | 12/2008 | Hess |
| 7,694,226 B2 * | 4/2010 | Covannon et al. ............ 715/731 |
| 7,698,266 B1 | 4/2010 | Weissman et al. |
| 7,779,012 B2 | 8/2010 | D'Urso |
| 2002/0042793 A1 | 4/2002 | Choi |
| 2002/0107859 A1 | 8/2002 | Tsuyuki |
| 2002/0129175 A1 | 9/2002 | Banavar et al. |
| 2003/0120630 A1 | 6/2003 | Tunkelang |
| 2004/0193514 A1 | 9/2004 | Kasravi et al. |
| 2004/0230570 A1 | 11/2004 | Hatta et al. |
| 2004/0249829 A1 | 12/2004 | Kasravi |
| 2005/0203970 A1 | 9/2005 | McKeown et al. |
| 2005/0210008 A1 | 9/2005 | Tran et al. |
| 2006/0004715 A1 * | 1/2006 | Lock et al. ............ 707/3 |
| 2006/0036592 A1 | 2/2006 | Das et al. |
| 2006/0042483 A1 * | 3/2006 | Work et al. ............ 101/91 |
| 2006/0059210 A1 | 3/2006 | MacDonald et al. |
| 2006/0218111 A1 | 9/2006 | Cohen |
| 2006/0235873 A1 | 10/2006 | Thomas |
| 2006/0294086 A1 * | 12/2006 | Rose et al. ............ 707/3 |
| 2007/0014241 A1 | 1/2007 | Banerjee et al. |
| 2007/0073748 A1 | 3/2007 | Barney |
| 2007/0112758 A1 | 5/2007 | Livaditis |
| 2007/0174247 A1 | 7/2007 | Xu et al. |
| 2007/0203906 A1 * | 8/2007 | Cone et al. ............ 707/6 |
| 2007/0214121 A1 | 9/2007 | Ebanks |
| 2007/0239676 A1 | 10/2007 | Stonehocker et al. |
| 2007/0239678 A1 | 10/2007 | Olkin et al. |
| 2007/0239741 A1 | 10/2007 | Jordahl |
| 2007/0244854 A1 | 10/2007 | Nevill-Manning et al. |
| 2007/0271235 A1 | 11/2007 | Frank et al. |
| 2008/0091672 A1 | 4/2008 | Gloor |
| 2008/0140684 A1 * | 6/2008 | O'Reilly et al. ............ 707/100 |
| 2009/0063557 A1 | 3/2009 | MacPherson |

OTHER PUBLICATIONS

Dar et al., "Extending SQL with Generalized Transitive Closure", *IEEE Transactions on Knowledge and Data Engineering, IEEE Service Center*, vol. 5, 5, XP002371448, Oct. 1993 (14 pages).

European Patent Office, "International Preliminary Report on Patentability", International application No. PCT/US2007/006896, dated Sep. 11, 2008 (21 pages).

Claims, International application No. PCT/US2007/006896 (2 pages).

PCT Invitation to Pay Additional Fees dated Sep. 26, 2007 received in corresponding International application No. PCT/US2007/006896 (9 pages).

Sheng, L. et al., "A Graph Query Language and Its Query Processing", XP-000895387, *IEEE*, 1999 (pp. 572-582).

\* cited by examiner

CONTEXTUAL SEARCH OF A COLLABORATIVE ENVIRONMENT

CROSS-REFERENCE TO RELATED APPLICATIONS; BENEFIT CLAIM

This application is a Continuation of U.S. patent application Ser. No. 11/393,139, filed Mar. 29, 2006, the entire contents of which is hereby incorporated by reference for all purposes as if fully set forth herein. The Applicants hereby rescind any disclaimer of claim scope in the parent application or the prosecution history thereof and advise the USPTO that the claims in this application may be broader than any claim in the parent application(s).

FIELD OF THE INVENTION

The present invention relates to searching and, more specifically, to searching based on relationships between searchable items.

BACKGROUND

Computer users frequently search for items. Two common types of search include searches for web pages using Internet search engines, and searching directories of a disk for files. In both cases, the search mechanism typically allows the user to specify properties (keywords, filenames, etc.) possessed by the items for which the user is searching. The search engine searches for items that have the specified properties, and presents a set of matching items to the user. In some cases, the set of matching items may be ranked. For example, Internet search engines typically rank matching items based on estimated relevance to the search criteria.

In most search environments, the searchable items that are the target of any given search tend to be homogenous. For example, in a file system environment, file system search engines typically only execute searches against files. In the Internet environment, any given search of an Internet search engine is typically performed only against all indexed web pages, all indexed digital images, or all indexed video clips. Web pages, digital images and video clips are all accessible as a URL, thus allowing Internet search engines to find them.

While searches that are executed against a specific type of item are useful in some contexts, other contexts, more flexible search mechanisms would be better. For example, in collaborative environments, many types of "collaborative artifacts" are generated. A collaborative artifact is any item produced as the result of some action. Examples of collaborative artifacts include office documents, emails, voice transcripts, instant messaging transcripts, faxes, images, etc.

Up until now, the conventional way to find anything in a collaborative environment was doing a "brute force" search through a file system. To effectively use a brute force file system search, the artifacts had to be all in one place. However, even with all of the artifacts in the same place, the search had to look at everything and had little notion (if any) of what was more relevant information for what the user searched. Further, the entire scope of the search was just the file system directory hierarchy. People and 'context' of the search were never part of the search equation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
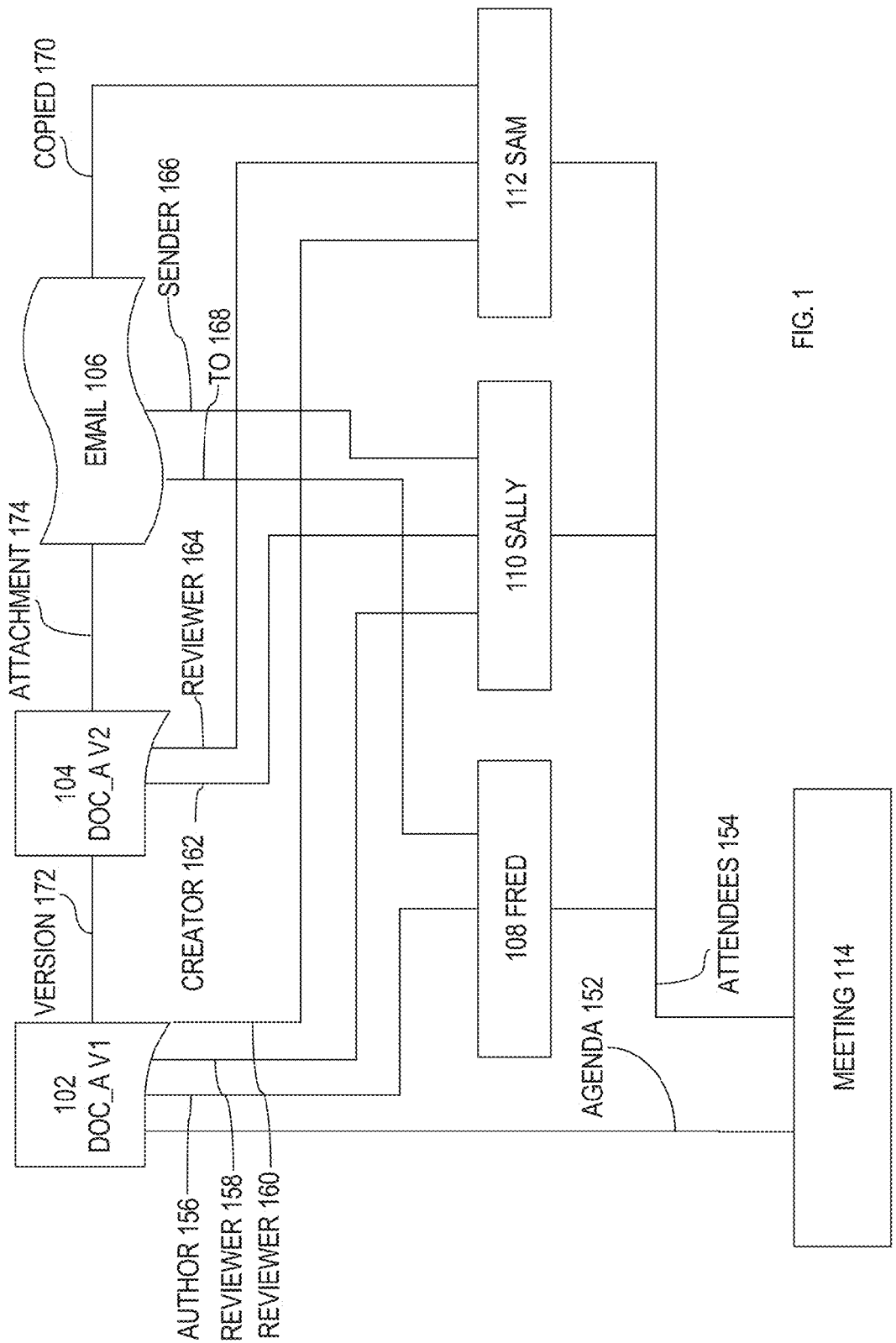
FIG. 1 is a block diagram illustrating bonds between searchable items, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for capturing the "relationships" between searchable items, and using those relationships to improve searches executed against the searchable items. The data items used to record the relationships are referred to herein as "bonds". Unlike "links" found within web pages, bonds exist separate from the items whose relationship they represent. Taken collectively, the relationships represented by the bonds form a connected graph, where the nodes of the graph correspond to searchable items and the edges of the graph correspond to bonds between the searchable items.

A search mechanism is provided which allows a search to start from any node in the graph. Preferably, the start-node is selected based on a logical connection to the item represented by the search node and the target of the search. In one embodiment, the network of relationships dictates the sequence in which the search is performed. For example, the path of the search may be to follow the relationships starting from the start-node to each immediately connected node (first degree of separation). If no match is found, then the search mechanism may repeat the search for each of those first degree nodes outward (to second degree and so on). By searching in this manner, the chances that the correct results will be found early in the search process are improved.

In one embodiment, the network of relationships affects which search items are considered in a search. For example, the search mechanism may allow a user to specify both a start-node, and a maximum degree of separation. In this example, the search mechanism may proceed as described above, but stop the search after reaching nodes at the specified maximum degree of separation. Thus, nodes that fall outside the specified maximum degree of separation would not even be considered in the search.

As another example, the search mechanism may allow a user to specify a maximum number of hits. Once that number of hits has been reached, the search operation stops. Consequently, the search will return the searchable items associated with the N matching nodes that are closest to the start-node, where N is the specified maximum number of hits.

In one embodiment, the search is performed against the entire collection of searchable items. However, the degree of separation between the start-node and the matching items is one of the factors used to determine how those matching items are ranked. Thus, a matching item of a node that is located closer to the start-node may be ranked higher, in the search results, than matching items of nodes that are located further from the start node.

Searchable Items

As used herein, the term "searchable item" is used to refer to any item against which a search may be performed. In the context of collaboration system, the searchable items may include both "actors" and "artifacts". An actor is a person (or the electronic information that represents a person). An artifact is any item produced as the result of some action. Depending on the system, artifacts may include: entire web pages, parts of web pages, documents (word processing documents, spreadsheets, etc.), email messages, images, tasks, meetings, etc.

The techniques described hereafter allow searches to be performed against a heterogeneous collection of searchable items. For example, one may search for all searchable items directly related to a particular meeting. The result of such a search may include a set of invitees, a set of attendees, a document (the agenda), and a set of email messages relating to the meeting.

A collaboration environment is merely one example of a context in which the techniques described herein may be used. However, the techniques are not limited to any particular context. For example, these techniques may be used by a file system search engine, an Internet search engine, or any other context in which searches are performed to locate items represented by digital information.

Bonds

As mentioned above, the techniques described herein involve storing bonds that represent relationships between items in a set of searchable items, and then using the network represented by the bonds to facilitate searches performed against the set of searchable items. Significantly, the bonds are generated and stored separate from the items that they tie together. Consequently, the bonds are able to represent relationships between items which, by their nature, do not support inter-item links. For example, a bond may represent a link between a person and an image file, where neither the person nor the image file is represented in a format that supports inter-item links.

According to one embodiment, there are many types of bonds. Different types of bonds have different attributes. The only attribute of the simplest form of bond is an attribute that identifies the searchable items that are in the relationship represented by the bond. In more complex forms, the attributes of a bond may also specify the type of the bond, the creation date of the bond, security rules relating to the bond, etc. There is no limit to the complexity of the structure of bonds.

Bonds may be one-to-one, one-to-many, or many-to-one. For example, the bond between a meeting and the attendees of the meeting may be one-to-many. On the other hand, the bond between an email message and the sender of the email message may be one-to-one.

Typed Bonds

According to one embodiment, a set of predefined bond types are established. Each bond type is used to represent a different type of relationship. For example, there may be a "generic" bond type, an "author of" bond type, a "reviewer" bond type, and an "attendee" bond type. Different types of information may be relevant to different types of relationships. Consequently, each bond type has a set of attributes that may be different from the attributes of other bond types. For example, the generic bond type may only have attributes for identifying the items involved in the relationship, while the "attendee" bond type may also include a date attribute to indicate the dates of attendance, and a "required" attribute to indicate whether the particular attendee's attendance is optional or mandatory.

Instead of or in addition to providing a set of predefined bond types, a mechanism may be provided that allows users to (a) create custom user-defined bond types, and (b) extend the attributes of the predefined bond types. As an example of the latter, a user may want to add a conductor attribute to the attendee bond type, to designate whether the attendee identified in the bond was the one that conducted the meeting identified in the bond.

Establishing Bonds Between Searchable Items

Before bonds can be used to facilitate searches performed against a set of searchable items, the bonds have to be created. According to one embodiment, a mechanism is provided to allow users to manually create bonds. For example, a user interface may be provided which allows the user to specify (1) a type of bond, and (2) the searchable items that are involved in the relationship that the bond will represent. Once the bond type and related items are specified, the attributes of the bond are either automatically or manually populated with values, and the bond is durably stored.

For example, a user may manually create a bond between a word processing document and a meeting by (1) selecting the "agenda of" bond type, (2) selecting the word processing document, (3) selecting the meeting, and (4) providing values for any attributes of the "agenda of" bond type. Once created, the bond is stored and used to facilitate searching of the searchable items, as shall be described in greater detail below.

Instead of or in addition to the manual creation of bonds, a mechanism may be provided to automatically create bonds based on activity within a system. For example, assume that a user X sends an email to user Y, where the email contains an attached document. In this example, the system may be configured to automatically generate and store a "sender" bond between user X and the email, a "sent to" bond between user Y and the email, and an "attached to" bond between the email and the attached document. When these bonds are generated, the attributes of the bonds may be automatically populated by the system. In one embodiment, the system may prompt the user to manually specify values for one or more of the attributes of an automatically generated bond.

The sending of an email is merely one example of an action that can lead to the automatic creation and storage of bonds. Virtually any action that establishes relationships between electronically-represented things can result in the generation and storage of one or more bonds. For example, storing a new document may cause automatic generation of an "author" bond between the user and the newly stored document. Inviting a set of people to a meeting may cause the automatic generation of "invitee" bonds between the meeting and each of the invitees. When a meeting is held as a video conference, the captured video from the video conference may be saved, and a "video of" bond may be automatically created between the meeting and the captured video.

Example Relationship Network

Referring to FIG. 1, it is a block diagram that illustrates a relationship network according to an embodiment of the invention. The items (nodes) in the illustrated relationship network include three people (Fred 108, Sally 110 and Sam 112) two versions (102 and 104) of a document, an email 106, and a meeting 114.

The relationships between the nodes include:
- an "agenda" relationship 152 between DOC_A V1 102 and meeting 114
- an "author" relationship 156 between DOC_A V1 102 and Fred 108
- a "reviewer" relationship 158 between DOC_A V1 102 and Sally 110
- a "reviewer" relationship 160 between DOC_A V1 102 and Sam 112
- a "creator" relationship 162 between DOC_A V2 104 and Sally 110
- a "reviewer" relationship 164 between DOC_A V2 104 and Sam 112
- a "sent to" relationship 168 between email 106 and Fred 108
- a "sender" relationship 166 between email 106 and Sally 110
- a "copied" relationship 170 between email 106 and Sam 112
- an attendees relationship 154 between meeting 114 and Fred 108, Sally 110 and Sam 112
- a "version" relationship 172 between DOC_A V1 102 and DOC_A V2 104
- an attachment relationship 174 between email 106 and DOC_A V2 104.

Bonds representing the relationships illustrated in FIG. 1 may be manually or automatically generated. For example, a bond for the author 146 relationship may be automatically created when Fred saves DOC_A V1. Fred may then manually specify that DOC_A V1 is the agenda for meeting 114, resulting in the generation of a bond for agenda relationship 152. Fred 108 may identify Sally and Sam as reviewers of DOC_A V1, causing bonds to be generated for relationships 158 and 160.

Sally may modify DOC_A, to create DOC_A V2. This modification results in generation of bonds for relationships 172 and 162. Sally may then ask Sam to review DOC_A V2, resulting in generation of a bond for relationship 164. After Sam approves the revision, Sally may send the revised document back to Fred in an email, to which Sam is copied. Attaching the document and sending the email results in the generation of bonds for relationships 168, 166, 174 and 170. Finally, Fred Sally and Sam attend the meeting, resulting in generation of a bond for one-to-many relationship 154.

Bond Representation

As mentioned above, bonds are manually and/or automatically generated based on relationships between items. The data structures used to represent such bonds, and the containers used to store them, may vary from implementation to implementation. The techniques described herein are not limited to any particular bond data structure nor storage mechanism.

Figure 2:
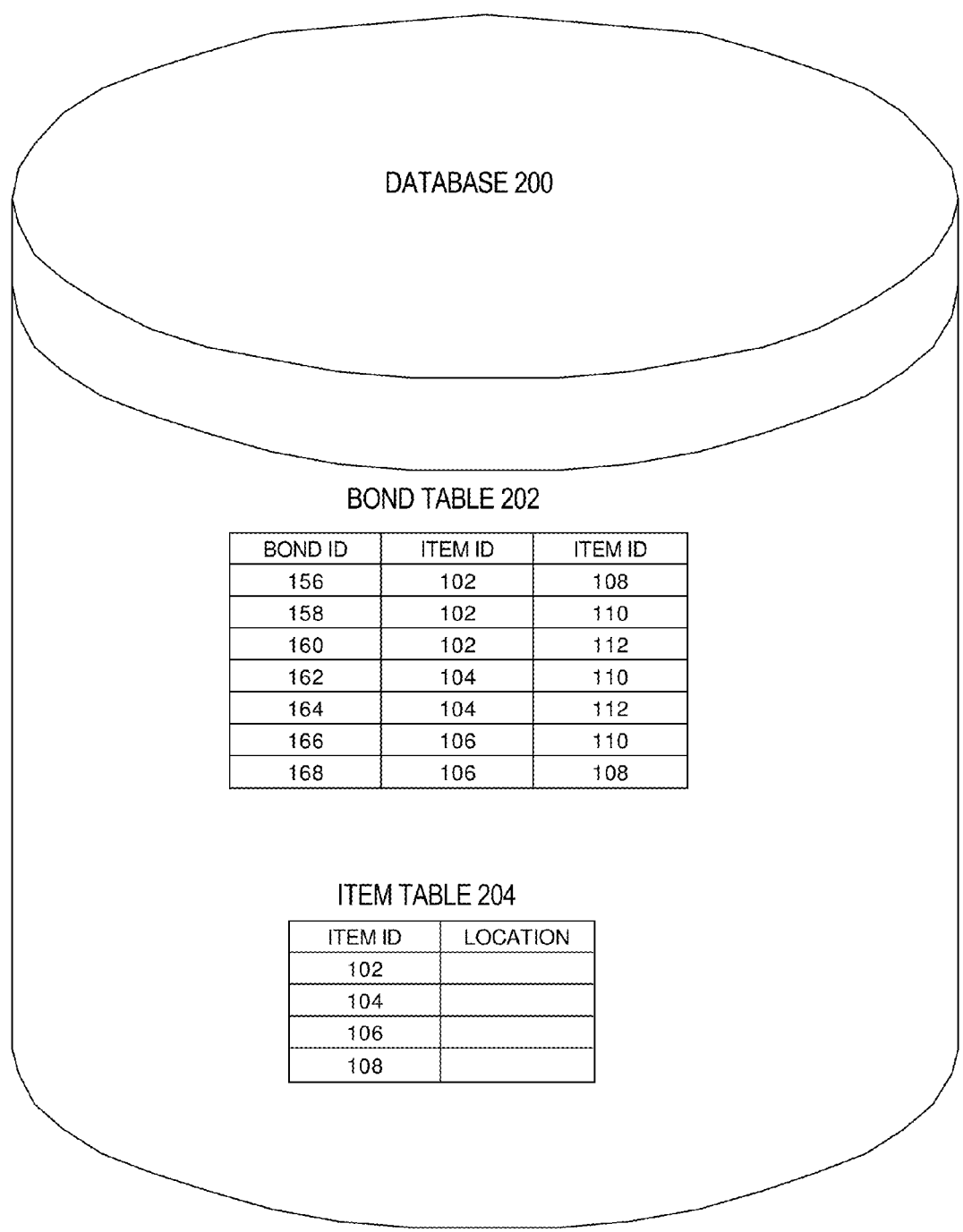
FIG. 2 is a block diagram illustrating how bonds and searchable items may be represented in a database, according to an embodiment of the invention.

Referring to FIG. 2, it illustrates a simple mechanism for representing and storing bonds. In FIG. 2, a database 200 includes a bond table 202 and an item table 204. Item table 204 includes a row for each searchable item. The row for each searchable item includes an item identifier, and location information. The item identifier serves to uniquely identify the item relative to all other items in the set of searchable items. The location information for a row indicates where the item identified in the row (or information about the item) is located.

Significantly, the items themselves need not be stored in item table 204. In fact, the items may not even be in database 200, nor in the network in which database 200 resides. Thus, the items represented in item table 204 may include files spread across many storage devices, email spread across many email systems, people from many different companies, etc. Thus, item table 204 may include rows for a heterogeneous set of items, spread across a heterogeneous set of systems.

Bond table 202 stores rows that represent bonds. Each row includes a bond identifier, and two item identifiers. The bond identifier for the row uniquely identifies the bond represented by the row, and the two item identifiers represent the two items in the relationship represented by the bond. For example, the first row of bond table 202 stores the bond for relationship 156 of FIG. 1. Thus, the row includes bond identifier 156, and item identifiers 102 and 108. Identifiers 102 and 108 respectively represent DOC_A V1 102 and Fred 108 from FIG. 1.

The bonds represented in bond table 202 are simple bonds. More complex bonds would include additional attributes. For bonds that have additional attributes, bond table 202 may include more columns, or may include keys to rows of one or more other tables that are used to store the additional attributes. Similarly, additional tables may be used to support bonds for one-to-many and many-to-one relationships.

Significantly, the bond that reflects a relationship between items may persist even after the items themselves no longer reflect the relationship. For example, attachment bond 174 may persist even after DOC_A V2 104 has been detached from email 106. Thus, the bonds may be used to discover, and search based on, relationships that are no longer reflected any place other than the bonds.

Searching Criteria

According to one embodiment, the search mechanism allows a user to pick a searchable item as a "starting point" for the search. As shall be described in detail hereafter, the selected starting point may affect both the contents and the ranking of search results.

In addition to the starting point, the user may specify:
- search criteria relating to searchable items
- search criteria relating to bonds
- search criteria relating to degree of separation
- search criteria relating to stop conditions Search criteria relating to searchable items typically specifies some desired characteristic of the searchable items. In general, the type of search criteria specified for items will depend on the characteristics of the items that are sought. For example, if the items are documents (such as word processing documents, spreadsheets or web pages), a user may specify certain keywords contained in the documents. If the items are files, the user may specify a creation date, a modification date, a filename, size, etc. If the items are meetings, a user may specify dates, organizers, durations, etc. If the items are people, the search criteria may include names, ages, gender, position, etc.

There is often overlap in the characteristics of different types of items. Thus, a search that specifies a "size" may be matched by email, documents, images, etc.

Search criteria relating to bonds typically specify some desired characteristic of the bonds that should be traversed during the search operation. For example, the starting point of a search may be a meeting, and the search criteria may limit the search to only "invitees". Consequently, during the search, the search mechanism would only traverse bonds that are "invitee" bonds.

As another example, the search criteria may impose constraints on the values of the attributes of bonds. Bonds that do not have attribute values that satisfy the constraints are not traversed. For example, the "attendee" bond may include a "required" attribute. For any given attendee bond, the value of the "required" attribute may be "true" or "false". To further constrain a search for attendees, a user may constrain the search to attendee bonds where "required" equals "true". Significantly, this constraint is on an attribute of the relationship, and not on any attribute of the searchable items against which the search is performed.

Search criteria relating to the degree of separation dictates how far to extend the search, relative to the specified starting point. For example, a user can specify that the degree of separation used in a search is less than or equal to 5. Under these circumstances, the searching would be limited to those nodes that are within five bond traversals of the starting point.

As another example, the search criteria relating to the degree of separation may specify a degree of separation of 4. Under these circumstances, only those searchable items that are exactly 4 bond traversals from the starting point would qualify to be included in the search results.

With respect to stop conditions, a user may specify that the search should stop after locating a specified number of matching items. In an embodiment, where the start-point dictates the order in which searching is performed, specifying a stop point of N matching items would generate a result set of the N matching items closest to the start-point. Consequently, changing the start-point of the search may produce completely different results even though the specified search criteria remain the same.

Searching Based on Bonds

As mentioned above, the connected network represented by the stored bonds is used to facilitate searches performed against the set of searchable items. Specifically, when doing a search, the bonds are used as a traversal path in a manner that affects one or more of (1) which items are searched, (2) the order in which the items are searched, and (3) the ranking of the search results.

According to one embodiment, the search begins at the specified starting point and then proceeds in phases, where each successive phase is performed at an incrementally-higher degree of separation. For example, during the first phase, the queries searching criteria is compared against all searchable items that reside, within the connected network, at one degree of separation from the starting point. Thus, if the starting point is DOC_A v2 104 in FIG. 1, then the matching criteria of the query would be compared against DOC_A V1 102, Sally 110, Sam 112, and email 106.

During the second phase, the matching criteria are compared against all searchable items that reside at two degrees of separation from the starting point. In the present example, the second phase would involve comparing the matching criteria against Meeting 114 and Fred 108.

This search process would continue until all of the searchable items have been considered, or some other stop condition is satisfied. Other possible stop conditions include, for example, reaching a user-specified target number of "hits", or reaching a user-specified maximum degree of separation.

Even though the stop conditions have not been satisfied for the entire search, the search down any given traversal path may stop for a variety of reasons. For example, the search request may specify bond-specific search criteria. When such is the case, the search mechanism compares the bond-specific search criteria against the attributes of each bond. If the bond does not satisfy the bond-specific search criteria, then the bond is not traversed. Consequently, searchable items that are only reachable by traversing the bond are not considered in the search, even though such items may in fact satisfy all item-specific search criteria specified in the search.

According to another embodiment, the search is performed in a depth-first manner. For example, if a maximum degree of separation is specified, then the search proceeds down one traversal path until the maximum degree of separation is reached. The search then proceeds down another traversal path until the maximum degree of separation is reached. This process continues until all possible traversal paths have been traversed to the maximum degree of separation.

In yet another embodiment, the searchable items may be evaluated in an order that does not correspond to the connectivity of the bond network. However, the bond network may still affect the search results. For example, the degree of separation between a matching item and the starting point may affect the ranking of the matching item in the search results. Typically, the lower the degree of separation from the starting point, the more highly ranked the matching item.

Security-Limited Searching

Security policies may be another reason why the search down a specific traversal path may be prematurely terminated. According to one embodiment, bonds may include security attributes that govern which users are allowed to traverse the bonds. For example, assume that a particular bond has a security attribute that only allows traversal of the bond by a particular set of users. When a user that does not belong to the set is performing a search, the searching mechanism will not search beyond the bond, even though all user-specified search criteria are otherwise satisfied by the bond. For the purpose of the search, bonds that the user does not have permission to traverse are treated as though they did not exist. Consequently, the network traversal performed during the search will not reach searchable items that reside on the far side of such bonds.

According to one embodiment, bonds do not themselves have security attributes, but are considered to "inherit" the security attributes of their "far side" items. For example, assume that DOC_A V2 104 is the starting point of a search. Relative to DOC_A V2 104, email 106 is on the far side of attachment bond 174. Consequently, attachment bond 174 will be treated as having the same access controls that have been defined for email 106. If the user that is conducting the search is not allowed to see email 106, then the search mechanism will not traverse attachment 174.

Conversely, assume that email 106 is the starting point of a search. Relative to email 106, DOC_A V2 104 is on the far side of attachment bond 174. Consequently, attachment bond 174 will be treated as having the same access controls as DOC_A V2 104.

Hardware Overview

Figure 3:
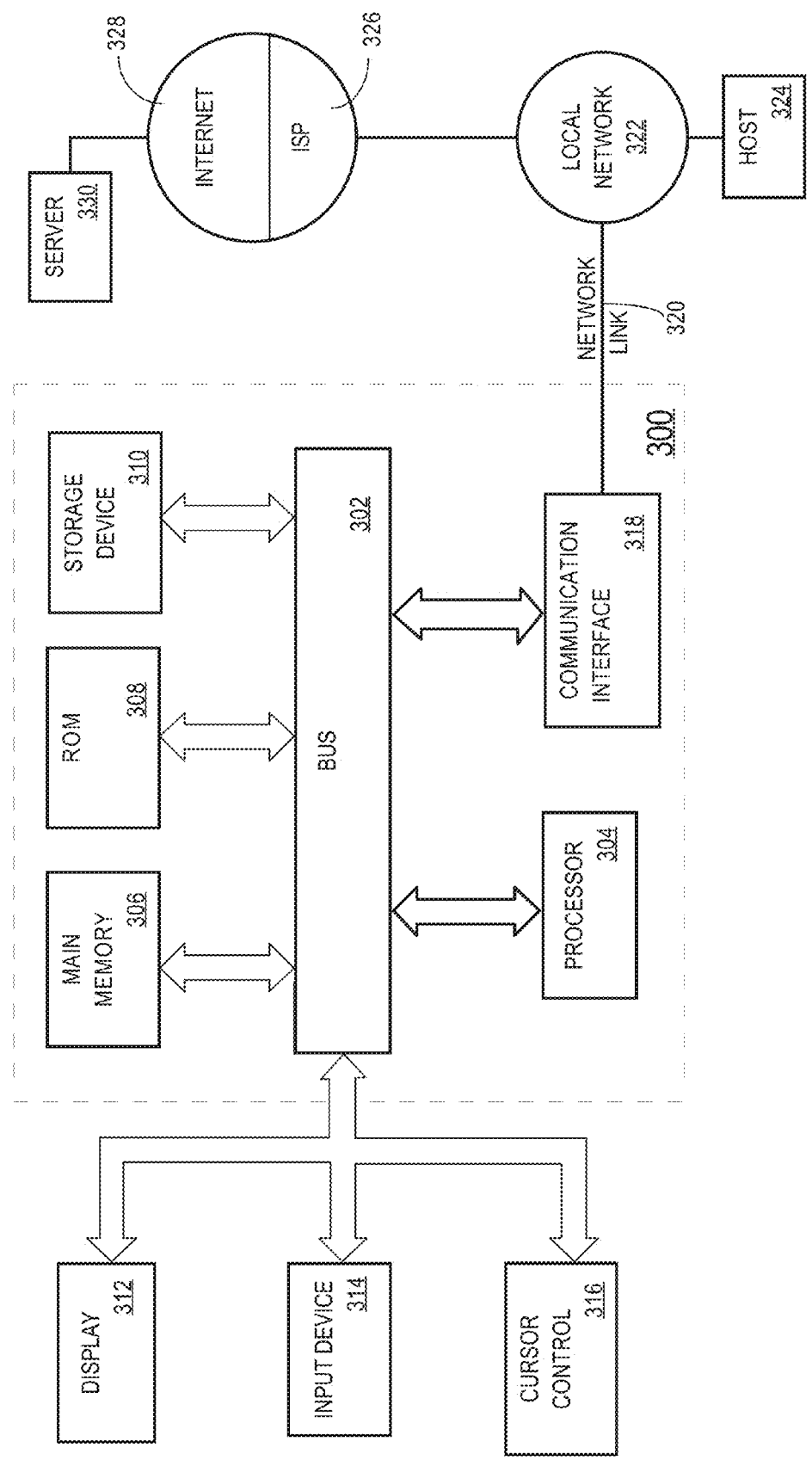
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory storage media storing instructions which, when executed by one or more processors, cause:
    storing bonds that reflect relationships between searchable items;
    wherein the bonds are not stored as part of the searchable items;
    wherein the bonds do not reflect storage location relationships between the searchable items;
    receiving a search request to perform a search to find items from among the searchable items that match search criteria of the search request;
    providing a search mechanism that enables a user to pick any searchable item, from among multiple of the searchable items, as a starting point of the search;
    receiving through the search mechanism, user input that selects a particular searchable item, from among the multiple searchable items, to be the starting point of the search;
    responding to said search request and to the user input that selects the particular searchable item by performing the search using the particular searchable item as the starting point for said search, wherein performing the search includes at least one of:
        (a) determining whether one or more attributes of a particular bond satisfy one or more criteria and ceasing to search down a traversal path that extends from the particular bond if the one or more attributes of the particular bond do not satisfy the one or more criteria, the search down the traversal path ceasing even when one or more of the searchable items that extend past the particular bond satisfy search criteria of the search request;
        (b) searching only those searchable items that are within a particular degree of separation of the particular searchable item, wherein the degree of separation between each of the searchable items and the particular searchable item is based on how many bonds must be traversed to arrive at said each of the searchable items from the particular searchable item;
        (c) determining an order in which each of a plurality of searchable items is compared against the search criteria of said search request based on the degree of separation of each of the plurality of searchable items from the particular searchable item, wherein the degree of separation between the particular searchable item and each searchable item of the plurality of searchable items is based on how many bonds must be traversed to arrive at said each searchable item from the particular searchable item; or
        (d) ranking a second plurality of searchable items that satisfy said search criteria based, at least in part, on the degree of separation between each searchable item of the second plurality of searchable items and the particular searchable item, wherein the degree of separation between the particular searchable item and each searchable item of the second plurality of searchable items is based on how many bonds must be traversed to arrive at said each searchable item from the particular searchable item.

2. The one or more storage media of claim 1, wherein performing the search includes searching only those searchable items that are within the particular degree of separation of the particular searchable item, and wherein the search request specifies said particular degree of separation.

3. The one or more storage media of claim 1, wherein performing the search includes determining the order in which each of the plurality of searchable items are compared against search criteria of said search request based on the degree of separation of each of the plurality of searchable items from the particular searchable item.

4. The one or more storage media of claim 3, wherein performing the search includes:
    searching against searchable items that are within a first degree of separation from said particular searchable item; and
    if the number of searchable items, within the first degree of separation from said particular searchable item, that match the search request is less than a predetermined threshold, then expanding the search to searchable items that are a second degree of separation from said particular search item.

5. The one or more storage media of claim 4, wherein the search request specifies the predetermined threshold.

6. The one or more storage media of claim 3, wherein performing the search includes:
    sequentially performing a series of searches relative to said particular searchable item;
    wherein the series of searches includes a first search and one or more subsequent searches;
    wherein each search of said one or more subsequent searches is performed against searchable items that are at a greater degree of separation from said particular searchable item than the searchable items that were searched in any search that preceded said search in said series.

7. The one or more storage media of claim 1, wherein performing the search includes ranking the second plurality of searchable items that match said search based, at least in part, on the degree of separation between the each searchable item of the second plurality of searchable items and the particular searchable item.

8. The one or more storage media of claim 1, wherein storing bonds includes storing at least one bond that represents a relationship that is not explicit in the contents of either of the searchable items involved in the relationship.

9. The one or more storage media of claim 1, wherein the instructions include instructions which, when executed by the one or more processors, further cause automatically creating bonds in response to one or more actions detected in a system.

10. The one or more storage media of claim 1, wherein performing the search includes:
    determining whether the one or more attributes of a particular bond satisfy the one or more criteria and ceasing to search down a traversal path that extends from the particular bond if the one or more attributes of the particular bond do not satisfy the one or more criteria;
    wherein the one or more criteria are specified in said search request.

11. The one or more storage media of claim 1, wherein performing the search includes:

determining whether the one or more attributes of a particular bond satisfy the one or more criteria and ceasing to search down a traversal path that extends from the particular bond if the one or more attributes of the particular bond do not satisfy the one or more criteria;

wherein determining whether the one or more attributes of a particular bond satisfy the one or more criteria comprises determining whether a user that requested said search satisfies one or more security restrictions associated with the particular bond.

12. The one or more storage media of claim 11, wherein the one or more security restrictions associated with said particular bond are identified in an attribute of said particular bond.

13. The one or more storage media of claim 11, wherein the one or more security restrictions associated with said particular bond are inherited from a searchable item on the far side of the particular bond, relative to the particular searchable item.

14. A method comprising:
  storing bonds that reflect relationships between searchable items;
  wherein the bonds are not stored as part of the searchable items;
  wherein the bonds do not reflect storage location relationships between the searchable items;
  receiving a search request to perform a search to find items from among the searchable items that match search criteria of the search request;
  providing a search mechanism that enables a user to pick any searchable item, from among multiple of the searchable items, as a starting point of the search;
  receiving through the search mechanism, user input that selects a particular searchable item, from among the multiple searchable items, to be the starting point of the search;
  responding to said search request and to the user input that selects the particular searchable item by performing the search using the particular searchable item as the starting point for said search;
  receiving a second search request to perform a second search to find items from among the searchable items that match second search criteria of the second search request;
  in response to the second search request, providing second search results that include the particular searchable item;
  wherein the method is performed by one or more computing devices.

15. The method of claim 14, wherein performing the search includes at least one of:
  (a) determining whether one or more attributes of a particular bond satisfy one or more criteria and ceasing to search down a traversal path that extends from the particular bond if the one or more attributes of the particular bond do not satisfy the one or more criteria, the search down the traversal path ceasing even when one or more of the searchable items that extend past the particular bond satisfy search criteria of the search request;
  (b) searching only those searchable items that are within a particular degree of separation of the particular searchable item, wherein the degree of separation between each of the searchable items and the particular searchable item is based on how many bonds must be traversed to arrive at said each of the searchable items from the particular searchable item;
  (c) determining an order in which each of a plurality of searchable items is compared against the search criteria of said search request based on the degree of separation of each of the plurality of searchable items from the particular searchable item, wherein the degree of separation between the particular searchable item and each searchable item of the plurality of searchable items is based on how many bonds must be traversed to arrive at said each searchable item from the particular searchable item; or
  (d) ranking a second plurality of searchable items that match said search criteria based, at least in part, on the degree of separation between each searchable item of the second plurality of searchable items and the particular searchable item, wherein the degree of separation between the particular searchable item and each searchable item of the second plurality of searchable items is based on how many bonds must be traversed to arrive at said each searchable item from the particular searchable item.

16. The method of claim 15, wherein performing the search includes searching only those searchable items that are within the particular degree of separation of the particular searchable item.

17. The method of claim 15, wherein performing the search includes determining the order in which each of the plurality of searchable items is compared against search criteria of said search request based on the degree of separation of each of the plurality of searchable items from the particular searchable item.

18. The method of claim 17, wherein performing the search includes:
  searching against searchable items that are within a first degree of separation from said particular searchable item; and
  if the number of searchable items, within the first degree of separation from said particular searchable item, that match the search request is less than a predetermined threshold, then expanding the search to searchable items that are a second degree of separation from said particular search item.

19. The method claim 15, wherein performing the search includes:
  determining whether the one or more attributes of the particular bond satisfy the one or more criteria and ceasing to search down a traversal path that extends from the particular bond if the one or more attributes of the particular bond do not satisfy the one or more criteria;
  wherein the one or more criteria are specified in said search request.

20. The method of claim 15, wherein performing the search includes:
  determining whether the one or more attributes of a particular bond satisfy one or more criteria and ceasing to search down a traversal path that extends from the particular bond if the one or more attributes of the particular bond do not satisfy the one or more criteria;
  wherein determining whether one or more attributes of a particular bond satisfy one or more criteria comprises determining whether a user that requested said search satisfies one or more security restrictions associated with the particular bond.

21. A method comprising:
  storing bonds that reflect relationships between searchable items;
  wherein the bonds are not stored as part of the searchable items;
  wherein the bonds do not reflect storage location relationships between the searchable items;

receiving a search request to perform a search to find items from among the searchable items that match search criteria of the search request;
determining that a particular searchable item is to be the starting point of the search;
responding to said search request by performing the search relative to the particular searchable item that is to be used as a starting point for said search, wherein performing the search includes at least one of:
 (a) determining whether one or more attributes of a particular bond satisfy one or more criteria and ceasing to search down a traversal path that extends from the particular bond if the one or more attributes of the particular bond do not satisfy the one or more criteria, the search down the traversal path ceasing even when one or more of the searchable items that extend past the particular bond satisfy search criteria of the search request;
 (b) searching only those searchable items that are within a particular degree of separation of the particular searchable item, wherein the degree of separation between each of the searchable items and the particular searchable item is based on how many bonds must be traversed to arrive at said each of the searchable items from the particular searchable item;
 (c) determining an order in which each of a plurality of searchable items is compared against the search criteria of said search request based on the degree of separation of each of the plurality of searchable items from the particular searchable item, wherein the degree of separation between the particular searchable item and each searchable item of the plurality of searchable items is based on how many bonds must be traversed to arrive at said each searchable item from the particular searchable item; or
 (d) ranking a second plurality of searchable items that match said search based, at least in part, on the degree of separation between each searchable item of the second plurality of searchable items and the particular searchable item, wherein the degree of separation between the particular searchable item and each searchable item of the second plurality of searchable items is based on how many bonds must be traversed to arrive at said each searchable item from the particular searchable item;
receiving a second search request to perform a second search to find items from among the searchable items that match second search criteria of the second search request;
in response to the second search request, providing second search results that include the particular searchable item;
wherein the method is performed by one or more computing devices.

22. A method comprising:
storing bonds that reflect relationships between searchable items;
wherein the bonds are not stored as part of the searchable items;
wherein the bonds do not reflect storage location relationships between the searchable items;
receiving a search request to perform a search to find items from among the searchable items that match search criteria of the search request;
providing a search mechanism that enables a user to pick any searchable item, from among multiple of the searchable items, as a starting point of the search;
receiving through the search mechanism, user input that selects a particular searchable item, from among the multiple searchable items, to be the starting point of the search;
responding to said search request and to the user input that selects the particular searchable item by performing the search using the particular searchable item as the starting point for said search, wherein performing the search includes at least one of:
 (a) determining whether one or more attributes of a particular bond satisfy one or more criteria and ceasing to search down a traversal path that extends from the particular bond if the one or more attributes of the particular bond do not satisfy the one or more criteria, the search down the traversal path ceasing even when one or more of the searchable items that extend past the particular bond satisfy search criteria of the search request;
 (b) searching only those searchable items that are within a particular degree of separation of the particular searchable item, wherein the degree of separation between each of the searchable items and the particular searchable item is based on how many bonds must be traversed to arrive at said each of the searchable items from the particular searchable item;
 (c) determining an order in which each of a plurality of searchable items is compared against the search criteria of said search request based on the degree of separation of each of the plurality of searchable items from the particular searchable item, wherein the degree of separation between the particular searchable item and each searchable item of the plurality of searchable items is based on how many bonds must be traversed to arrive at said each searchable item from the particular searchable item; or
 (d) ranking a second plurality of searchable items that satisfy said search criteria based, at least in part, on the degree of separation between each searchable item of the second plurality of searchable items and the particular searchable item, wherein the degree of separation between the particular searchable item and each searchable item of the second plurality of searchable items is based on how many bonds must be traversed to arrive at said each searchable item from the particular searchable item;
wherein the method is performed by one or more computing devices.

* * * * *

UNITED STATES PATENT AND TRADEMARK OFFICE
CERTIFICATE OF CORRECTION

| | |
|---|---|
| PATENT NO. | : 9,081,819 B2 |
| APPLICATION NO. | : 13/671523 |
| DATED | : July 14, 2015 |
| INVENTOR(S) | : Olkin et al. |

It is certified that error appears in the above-identified patent and that said Letters Patent is hereby corrected as shown below:

IN THE SPECIFICATION

In column 7, line 62, delete "DOC_A v2" and insert -- DOC_A V2 --, therefor.

IN THE CLAIMS

In column 14, line 40, in Claim 19, after "method" insert -- of --.

Signed and Sealed this
First Day of March, 2016

Michelle K. Lee
*Director of the United States Patent and Trademark Office*